United States Patent
Yen et al.

(10) Patent No.: US 10,309,578 B2
(45) Date of Patent: Jun. 4, 2019

(54) QUICK RELEASE PIVOT MODULE AND SUPPORTING DEVICE

(71) Applicant: SYNCMOLD ENTERPRISE CORP., New Taipei (TW)

(72) Inventors: Ching-Hui Yen, New Taipei (TW); Chin-Cheng Hsu, New Taipei (TW); Jen-Yi Lee, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 153 days.

(21) Appl. No.: 15/684,299

(22) Filed: Aug. 23, 2017

(65) Prior Publication Data
US 2018/0187822 A1 Jul. 5, 2018

(30) Foreign Application Priority Data
Dec. 30, 2016 (TW) .............................. 105220128 U

(51) Int. Cl.
*F16M 11/04* (2006.01)
*F16C 11/04* (2006.01)
*F16M 11/10* (2006.01)
*F16M 11/20* (2006.01)
*F16M 13/02* (2006.01)

(52) U.S. Cl.
CPC ........... *F16M 11/041* (2013.01); *F16C 11/04* (2013.01); *F16M 11/10* (2013.01); *F16M 11/2064* (2013.01); *F16M 13/022* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,464,185 B1* | 10/2002 | Minelli | .................. | B60R 11/02 248/183.1 |
| 6,478,275 B1* | 11/2002 | Huang | .................. | F16M 11/08 248/278.1 |
| 6,672,553 B1* | 1/2004 | Lin | ........................ | F16M 11/08 248/276.1 |
| 6,769,657 B1* | 8/2004 | Huang | .................. | F16M 11/10 248/278.1 |

(Continued)

FOREIGN PATENT DOCUMENTS

TW    M409657 U    8/2011

*Primary Examiner* — Monica E Millner
(74) *Attorney, Agent, or Firm* — Muncy, Geissler, Olds & Lowe, P.C.

(57) ABSTRACT

A quick release pivot module is provided for connecting with a display and a supporting frame. The supporting frame includes a first joint, whereas the quick release pivot module includes a pivot structure and a quick release structure. A second joint and a first connector are pivotally assembled in the pivot structure, so that the first connector can pivot with respect to the second joint. The quick release structure has a first engaging portion and a second engaging portion connected with the first joint and the second joint, respectively. When the second engaging portion is engaged with the first engaging portion, the second joint of the quick release pivot module is fastened to and the first joint of the supporting frame. On the contrary, when the second engaging portion is disengaged with the first engaging portion, the second joint is adapted to being detachable from the first joint.

16 Claims, 6 Drawing Sheets

(56) References Cited

U.S. PATENT DOCUMENTS

| | | | | |
|---|---|---|---|---|
| 7,694,927 | B2* | 4/2010 | Chuang | F16M 11/041 |
| | | | | 248/276.1 |
| 7,922,137 | B2* | 4/2011 | Derry | A47B 21/0314 |
| | | | | 248/178.1 |
| 8,777,172 | B2* | 7/2014 | Sapper | F16M 11/08 |
| | | | | 248/274.1 |
| 9,133,982 | B1* | 9/2015 | Valdez | F16M 13/022 |
| 9,316,346 | B2* | 4/2016 | Lau | F16M 11/126 |
| 2002/0011544 | A1* | 1/2002 | Bosson | F16M 11/041 |
| | | | | 248/121 |
| 2005/0284997 | A1* | 12/2005 | Tisbo | F16M 11/08 |
| | | | | 248/276.1 |
| 2006/0266909 | A1* | 11/2006 | Oddsen, Jr. | F16M 11/105 |
| | | | | 248/371 |
| 2007/0040084 | A1* | 2/2007 | Sturman | F16M 11/105 |
| | | | | 248/280.11 |
| 2008/0237439 | A1* | 10/2008 | Oddsen | F16M 11/2014 |
| | | | | 248/631 |
| 2010/0084527 | A1* | 4/2010 | Lau | F16M 11/041 |
| | | | | 248/217.4 |
| 2011/0147546 | A1* | 6/2011 | Monsalve | F16M 11/041 |
| | | | | 248/122.1 |
| 2014/0367137 | A1* | 12/2014 | Leung | H02G 3/045 |
| | | | | 174/68.3 |

* cited by examiner

QUICK RELEASE PIVOT MODULE AND SUPPORTING DEVICE

CROSS REFERENCE TO RELATED APPLICATION

This application claims the benefits of the Taiwan Patent Application Serial Number 105220128, filed on Dec. 30, 2016, the subject matter of which is incorporated herein by reference.

BACKGROUND OF THE INVENTION

1. Field of the Invention

The present invention relates to a quick release pivot module and, more particularly, to a pivot module configured on a supporting device for holding a display and being detachably connected to a supporting frame of a supporting device.

2. Description of Related Art

Disclosed in Taiwan Patent No. M409657 is a conventional elevatable supporting stand that includes a frame, a sliding module and a fixing plate. The sliding module can slide upward and downward with respect to the frame, and includes two lateral plates slidably connected to the frame and a pivot structure mounted between the two lateral plates. The pivot structure includes a shaft and a torsional spring. The fixing plate for mounting a display is pivotally attached to the sliding module by the shaft, whereas the torsional spring is sleeved on the shaft and has two ends abutting against the fixing plate and the sliding module respectively.

Accordingly, when the display is mounted on the fixing plate and brought into pivot motion with respect to the sliding module, the torsional spring can provide a torque against the torque caused by the weight of the display. As a result, the display is able to be orientated at any tilt angle.

For instance, when the display to be mounted on the fixing plate weighs 5 kilograms, the torsional spring having tolerance for the 5 kg weight would be assembled in the supporting stand. However, only the 5-kg display can be mounted on the supporting stand provided with the torsional spring for bearing 5 kg weight. Accordingly, if another display of different weight is intended to be mounted on the supporting stand, the shaft pivotally assembled in the sliding module should be detached for replacement of the torsional spring. The disassembly and reassembly are time consuming and reduce the production efficiency of the supporting stand.

For the reasons stated above, an urgent need exists to develop a quick release pivot module that can address the aforementioned drawbacks.

SUMMARY OF THE INVENTION

A primary objective of the present invention is to provide a quick release pivot module for being disposed between and connected with a display and a supporting frame. The supporting frame has a first joint, whereas the quick release pivot module has a quick release structure and a second joint. The first joint and the second joint are able to be secured to each other by the quick release structure. When the quick release pivot module is intended to be replaced by another module having different bearing capacity, the quick release pivot module is able to be switched into an unlocked state. Accordingly, the first joint and the second joint would be brought into being not entirely interfered with each other, so that the quick release pivot module is able to be detached from the supporting frame and another quick release pivot module having different bearing capacity is able to be assembled thereto. Thereby, the assembly process is simplified and the supporting frame is able to be instantly provided with a suitable pivot module of corresponding specification according to the weight of the display by quick replacement of the pivot module.

In accordance with the foregoing and other objectives, the present invention provides a quick release pivot module for being disposed between a display and a supporting frame to selectively connect with the display and the supporting frame, the supporting frame including a first joint, and the quick release pivot module including a quick release structure and a pivot structure, wherein (i) the quick release structure has a first engaging portion and a second engaging portion, the first engaging portion being disposed on the first joint; (ii) the pivot structure is provided for connecting with the display and has a shaft, a second joint and a first connector, with the second joint being pivoted on the shaft and selectively connected with the second engaging portion, and the first connector being pivoted on the shaft and rotatable about the shaft with respect to the second joint so as to permit a tilt angle of the display to be adjusted by forcing the display to pivot about the shaft; and (iii) the second joint of the quick release pivot module and the first joint of the supporting frame are fastened together by the quick release structure when the second engaging portion and the first engaging portion are engaged with each other, and the second joint of the quick release pivot module is detachable from the first joint of the supporting frame when the second engaging portion and the first engaging portion are disengaged with each other.

The quick release structure can have a slide button and a connecting board. The slide button extends along a first axis, whereas the connecting board extends from the slide button along a second axis. In a preferred embodiment, the second engaging portion is a latch extending along a third axis to couple with the connecting board, while the first engaging portion has a hole and the second joint has a slide groove corresponding to the hole. Accordingly, the latch can extend through the slide groove to be selectively located in the hole. By retaining the latch in the hole, the second joint is fastened to the first joint. On the contrary, when the latch is moved off the hole along the first axis by movement of the slide button along the first axis, the second joint is adapted to being detachable from the first joint.

The second joint can have a first central board and two opposite first lateral plates. The first lateral plates extend from two ends of the first central board along the third axis, respectively. Additionally, the quick release structure can have a tension spring that extends along the first axis and has two ends fastened to the latch and one of the first lateral plates, respectively.

In a preferred embodiment, the quick release pivot module further includes a shell covering parts of the pivot structure and parts of the quick release structure. The shell can has a stepped through hole, with the slide button being disposed in the stepped through hole and the connecting board extending through the stepped through hole.

The second joint can have a stopper and a first protrusion extending from the first central board along the third axis. The stopper has a slot, while the first joint has a second protrusion and an aperture. Accordingly, when the second joint is connected with the first joint, the stopper is disposed on a top surface of the first joint, with the second protrusion being engaged in the slot and the first protrusion being embedded in the aperture.

The first engaging portion can have two bumps, of which one is formed with the hole and adjacent to the other one of the bumps. Preferably, the hole extends along the first axis.

The first connector may have a second central board and two opposite second lateral plates. The second lateral plates extend in parallel to each other from two ends of the second central board, respectively. Preferably, the first lateral plates and the second lateral plates each have an axle hole, and the shaft extends through each of the axle holes sequentially.

In the present invention, the first protrusions and the second protrusions are able to be secured in the apertures and the slots, respectively.

The pivot structure preferably has at least one torsional spring sleeved on the shaft. The torsional spring has two ends fastened to the second joint and the first connector, respectively. Accordingly, when the first connector pivots with respect to the second joint, the torsional spring generates a torque.

In a preferred embodiment, the first joint is a pulley provided for permitting the display to move upward and downward along the second axis.

The present invention further provides a supporting device to be disposed on a working surface for holding a display. The supporting device comprises a supporting frame and the aforementioned quick release pivot module disposed between the display and the supporting frame. Preferably, the supporting frame has a spring module for providing elastic force against weight of the display. The elastic force is adjustable according to the weight of the display.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
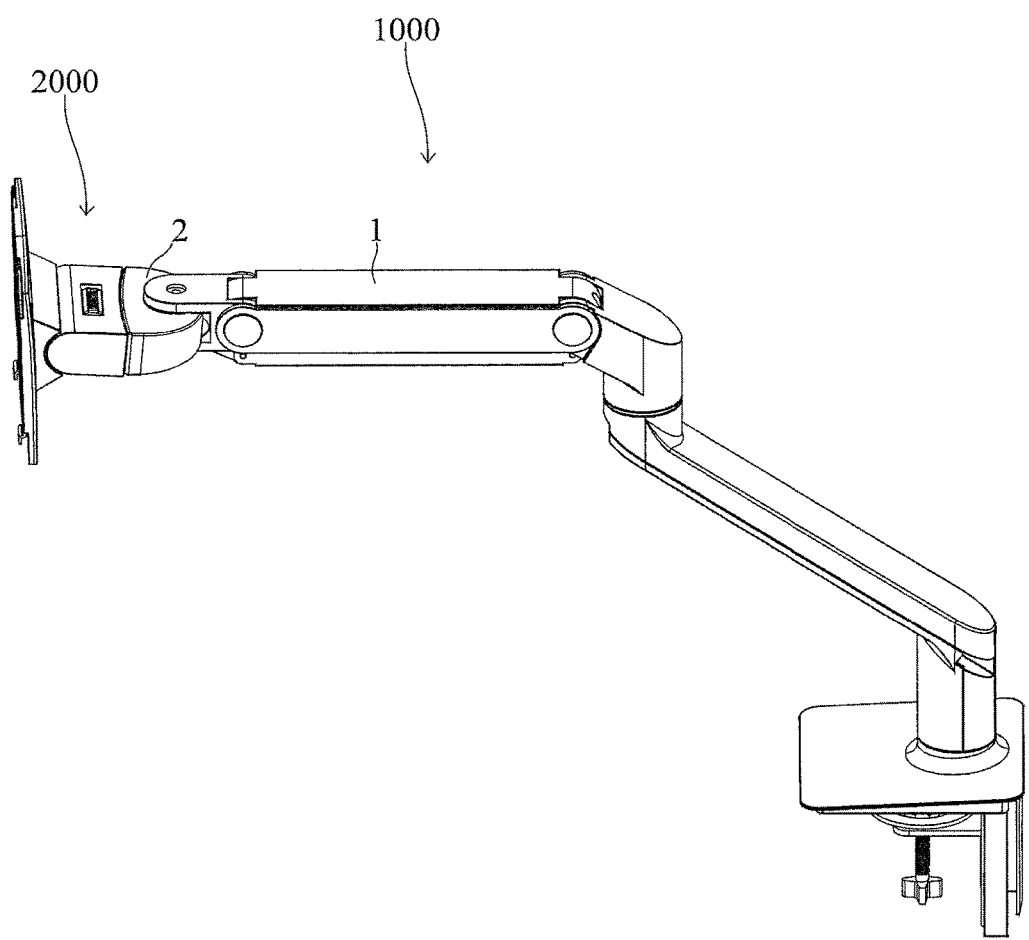
FIG. 1 is a perspective view of a quick release pivot module applied to an elevatable supporting frame in accordance with the present invention.

Please referring to FIG. 1, the first embodiment of the present invention provides a supporting device, which is able to be placed on a working face (such as desk) and adapted to hold a display. The supporting device includes a cantilever-type supporting frame 1000 and a quick release pivot module 2000. The quick release pivot module 2000 has one side attached to the cantilever-type supporting frame 1000 and an opposite side connected to a display (not shown in the figure). Specifically, the cantilever-type supporting frame 1000 has a cantilever arm 1 and a first joint 2. In this embodiment, the first joint 2 is a pivoting element attached to the cantilever arm 1 and adapted to be horizontally rotatable with respect to the cantilever arm 1.

Figure 2:
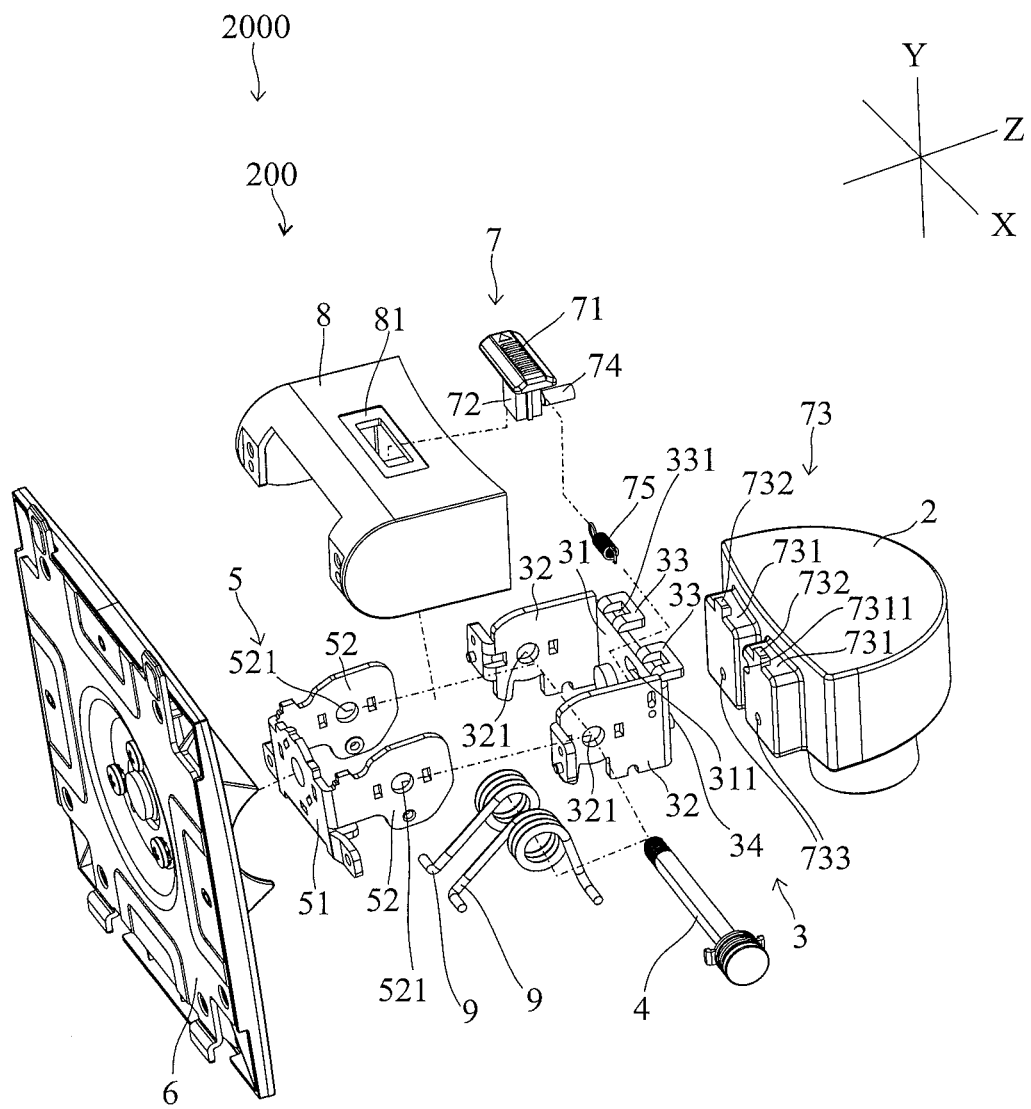
FIG. 2 is an exploded view of a quick release pivot module in accordance with the present invention.

Reference is next made to FIG. 2 for detailed illustration of the quick release pivot module 2000. The quick release pivot module 2000 includes a quick release structure 7 and a pivot structure 200. The pivot structure 200 includes a second joint 3, a shaft 4, a first connector 5, a second connector 6, a shell 8 and a plurality of torsional springs 9. For convenience of illustration, the left-right, up-down and front-back directions as viewed from the front of the second connector 6 are defined as a first axis X, a second axis Y and a third axis Z, respectively. The second joint 3 has a first central board 31, two opposite first lateral plates 32, two stoppers 33 and two first protrusions 34. The first central board 31 is formed with a slide groove 311 extending along the first axis X. The first lateral plates 32 extend from two opposite ends of the first central board 31, respectively, away from the first joint 2 along the third axis Z. The stoppers 33 and the first protrusions 34 extend along the third axis Z and are connected with the first central board 31, and each of the stoppers 33 has a slot 331.

The first connector 5 has a second central plate 51 and two opposite second lateral plates 52. The second lateral plates 52 extend in parallel to each other from two opposite ends of the second central board 51, respectively, toward the second joint 3 along the third axis Z. The second connector 6 has one side associated with the second central board 51 of the first connector 5 and the other side connected to a display (not shown in the figure). In this illustration, the first lateral plates 32 and the second lateral plates 52 each are formed with an axle hole 321, 521. The shaft 4 extends through all the axle holes 321, 521 sequentially, such that the first connector 5 is pivotally attached to the second joint 3 by the shaft 4. Additionally, the torsional spring 9 is sleeved on the shaft 4 and located between the second lateral plates 52. Two ends of the torsional spring 9 are fastened to the first central board 31 and the second central board 51, respectively. Accordingly, when the combination of the display (not shown in the figure), the second connector 6 and the first connector 5 pivots about the shaft 4 with respect to the second joint 3, the torsional spring 9 can provide a torque against the torque caused by the weight of the display and friction generated among components during operation so as to orientate the display device at any tilt angle.

Figure 3:
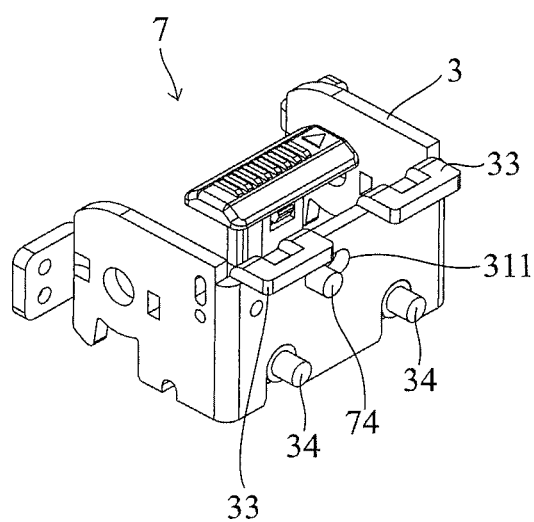
FIG. 3 is a partial perspective view of a quick release pivot module in accordance with the present invention.

Following description is provided for detailed illustration of the quick release structure 7 and the shell 8. The shell 8 covers the second joint 3, the shaft 4, the first connector 5 and parts of the quick release structure 7. Specifically, the shell 8 has a stepped through hole 81 that extends along the first axis X. The quick release structure 7 has a slide button 71, a connecting board 72, a first engaging portion 73, a second engaging portion 74 and a tension spring 75. The slide button 71 extends along the first axis X and is configured to be slidable in the stepped through hole 81 along the first axis X. The connecting board 72 extends through the stepped through hole 81 along the second axis Y and is associated with the slide button 71. In this embodiment, the second engaging portion 74 is a latch disposed at the connecting board 72 and extending along the third axis Z. When the slide button 71 moves in the stepped through hole 81 along the first axis X, the connecting board 72 and the second engaging portion 74 would be brought into movement along the first axis X. Additionally, the tension spring 75 has two ends connected to one of the first lateral plates 32 and the second engaging portion 74, respectively. As shown in FIG. 3, when the quick release structure 7 is associated with the second joint 3, the second engaging portion 74 is disposed in the slide groove 311 and has a projecting portion out of the slide groove 311. The first engaging portion 73 has two bumps 731, two second protrusions 732 and two apertures 733. The bumps 731 are disposed on the first joint 2 and spaced from each other. One of the bumps 731 is formed with a hole 7311 that extends along the first axis X and has an opening H facing the other bump 731. The second protrusions 732 and the apertures 733 are provided at the bumps 731.

Figure 4:
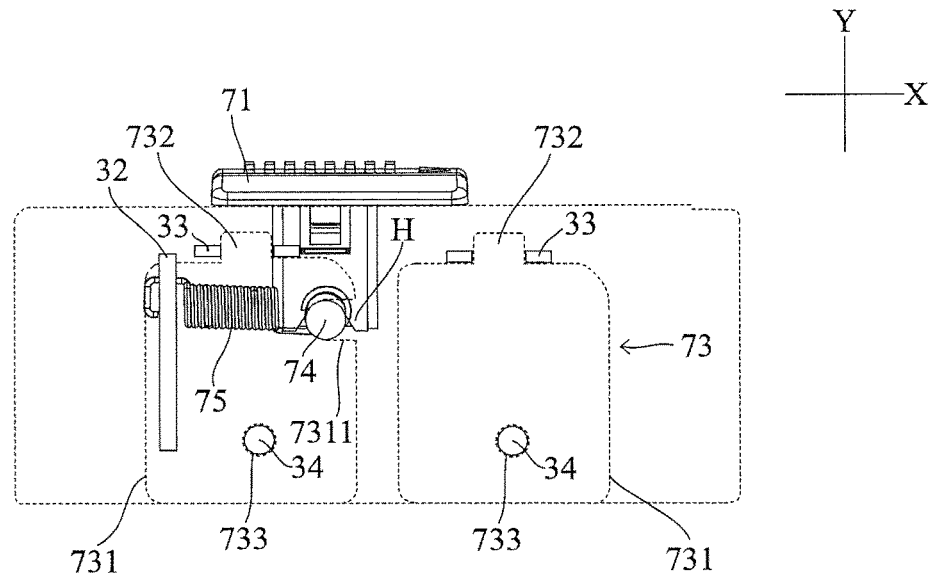
FIG. 4 is a partial schematic view of a quick release pivot module in a locked state in accordance with the present invention.
Figure 5:
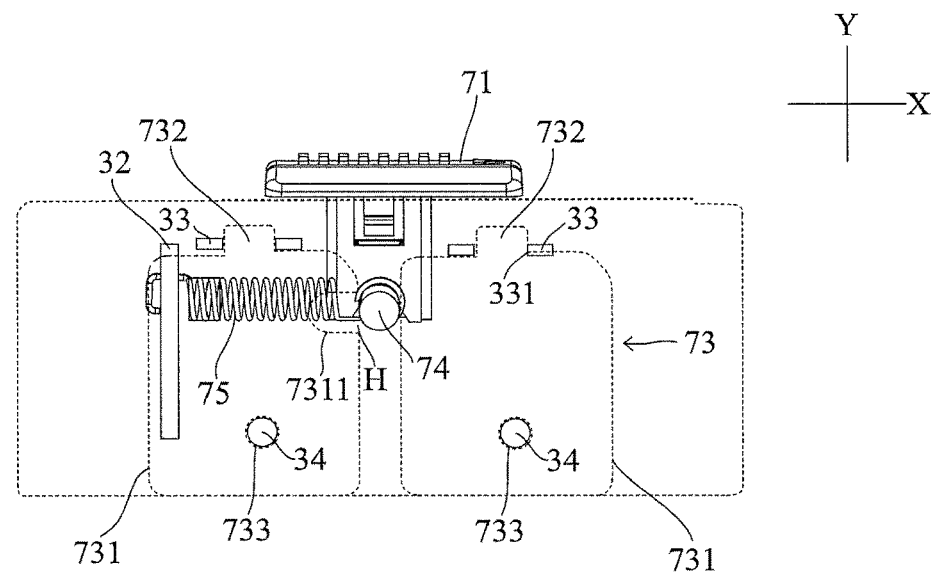
FIG. 5 is a partial schematic view of a quick release pivot module in an unlocked state in accordance with the present invention.

Attention is now directed to FIGS. 4 and 5, which are schematic views of the quick release pivot module in locked and unlocked states, respectively. For clear illustration of the relationship among the quick release structure 7, the first joint 2 and the second joint 3, all components are simplified in FIGS. 4 and 5 to show the critical parts only. As shown in FIG. 4, when the quick release pivot module 2000 is associated with the supporting frame 1000 and in a locked state, the slide button 71 is situated at a first location, and the projecting portion of the second engaging portion 74 out of the slide groove 311 is placed in the hole 7311. Accordingly, the tension spring 75 is kept in a relaxed state. Further, the stoppers 33 of the second joint 3 abut on the bumps 731 of the first engaging portion 73 in such a way that the first protrusions 34 and the second protrusions 732 are secured in the corresponding apertures 733 and slots 331, respectively. By the cooperation between the stoppers 33 and the second protrusions 732 of the bumps 731 and between the first protrusions 34 and the apertures 733 of the bumps 731, the detachment of the second joint 3 and the first joint 2 is able to be avoided at any angle. Accordingly, the display is able to be mounted on the supporting frame 1000 by the quick release pivot module 2000.

As shown in FIG. 5, for releasing the quick release pivot module 2000 from the supporting frame 1000, the quick release pivot module 2000 is operated into an unlocked state by moving the slide button 71 from the first location to a second location along the stepped through hole 81. In detail, the slide button 71 is brought into movement in the slide groove 311 along the first axis X and moves across the opening H of the hole 7311 to the location between the bumps 731. As a result, the tension spring 75 is stretched. Subsequently, the rotary motion of the second joint 3 about the first axis X can bring the first protrusions 34 and the second protrusions 732 to be separated from the apertures 733 and the stoppers 33, resulting in detachment of the first joint 2 and the second joint 3. By this operation, the quick release pivot module 2000 is able to be quickly released from the supporting frame 1000 and be replaced by another quick release pivot module in different specification. As the tension spring 75 is stretched in the unlocked state, the tension spring 75 is relaxed and returns to its default length upon releasing the slide button 71, and then the slide button 71 would be pulled back to the first location.

In conclusion, the pivot structure 200 is incorporated into an independent module that is configured to be quickly released from the cantilever-type supporting frame 100 by the quick release structure 7. Accordingly, the independent module is able to be promptly replaced by another one, having a second connector 6 and a pivot structure 4 provided with a different torsional spring 42, for mounting the display of different weight (scale) or brand. By the mechanism, the disassembly of the torsional spring and the second connector is able to be avoided. Additionally, for better cohesive feel, the quick release pivot module 2000 may be integrated with the display. For instance, the shell 8 can have the same color and sense as the housing of the display.

Figure 6:
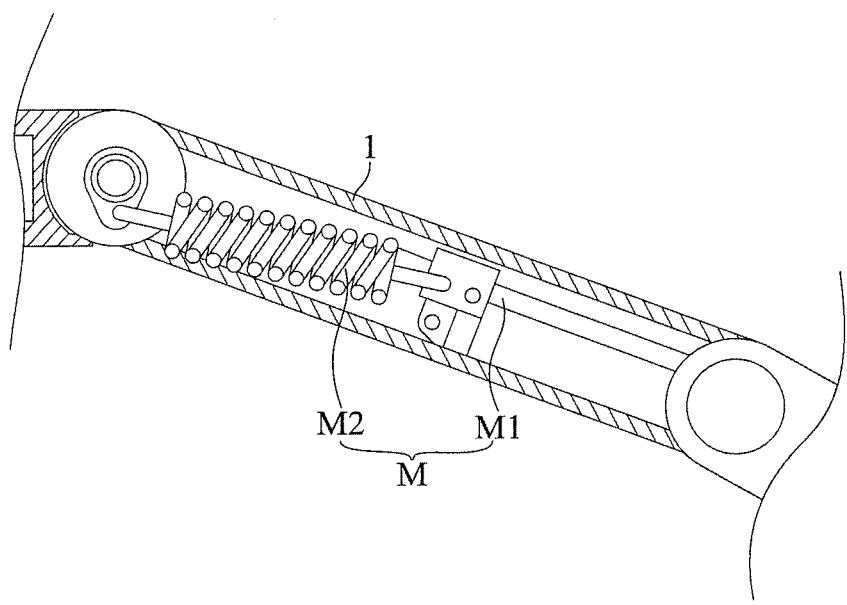
FIG. 6 is a partial cross-sectional view of an elevatable supporting frame in accordance with the present invention.

Moreover, by the quick release pivot module 2000 between the display and the supporting frame, the display and the supporting frame are able to be quickly replaced by other displays and supporting frames of different specifications (such as different weight, scale or brand). However, for mounting the display of different weight, the supporting frame typically further includes a spring module M in the cantilever arm 1. The spring module M can provide a resistance force to allow the display stop at any desired location. As shown in FIG. 6, the spring module M has a connecting bar M1 and a spring M2. The deformation degree of the spring M2 is able to be changed by the operation of the connecting bar M1 so as to generate different resistance force. Accordingly, any display of different weight is able to be stopped at any desired location.

Figure 7:
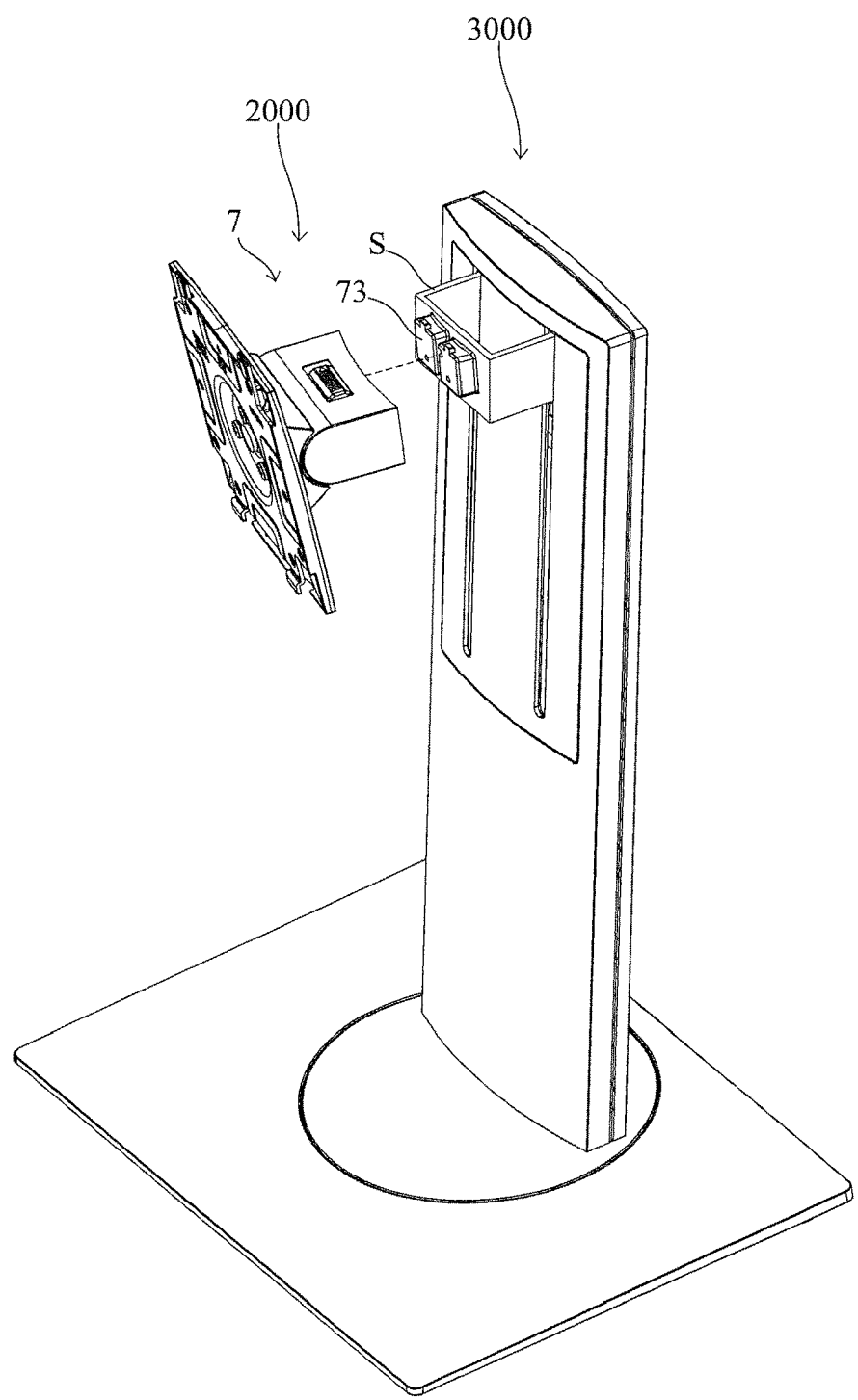
FIG. 7 is a perspective view of a quick release pivot module applied to a supporting frame having a sliding module in accordance with the present invention.

Please referring to FIG. 7, the second embodiment of the present invention provides another supporting device having the quick release pivot module 2000 assembled with another aspect of supporting frame 3000. The supporting frame 3000 has a sliding element S that is slidably attached to a track module (not shown in the figure) of the supporting frame 3000. In this embodiment, the first joint 2 is the sliding element S (such as a pulley), and the first engaging portion 73 of the quick release structure 7 is disposed on the sliding element S. Accordingly, the second engaging portion (not shown in the figure) of the quick release structure 7 is able to be detachably associated with the first engaging portion 73. The association of the quick release pivot module 2000 with the supporting frame of this embodiment is similar to that illustrated in the first embodiment, and the same description needs not to be repeated. In other words, the first engaging portion 73 of the quick release structure 7 is able to be formed on one component (such as aforementioned pivoting element or sliding element) of any type of supporting frame so that the quick release pivot module is able to be rapidly assembled with or released from the supporting frame.

In summary, the quick release pivot module includes the quick release structure and the second joint to be engaged with the first joint of the supporting frame. By moving the slide button of the quick release structure, the second engaging portion and the first engaging portion are able to be brought into interference with or separation from each other. Therefore, the quick release pivot module is able to be quickly secured to or released from the supporting frame. This is advantageous as various quick release pivot modules with different bearing capacity are able to be rapidly assembled to the supporting frame according to the weight of the display so as to save assembly time.

Although the present invention has been explained in relation to its preferred embodiment, it is to be understood that many other possible modifications and variations are able to be made without departing from the spirit and scope of the invention as hereinafter claimed.

What is claimed is:
1. A quick release pivot module for being disposed between a display and a supporting frame to selectively connect to the display and the supporting frame, the supporting frame comprising a first joint, and the quick release pivot module comprising:

a quick release structure, having a first engaging portion and a second engaging portion, wherein the first engaging portion is disposed on the first joint; and a pivot structure, being provided for connecting with the display and having:
 a shaft;
 a second joint, being pivoted on the shaft and selectively connected to the second engaging portion; and
 a first connector, being pivoted on the shaft and rotatable about the shaft with respect to the second joint so as to permit a tilt angle of the display to be adjusted by forcing the display to pivot about the shaft;

wherein (i) when the second engaging portion and the first engaging portion are engaged with each other, the second joint of the quick release pivot module and the first joint of the supporting frame are fastened together by the quick release structure, and (ii) when the second engaging portion and the first engaging portion are disengaged with each other, the second joint of the quick release pivot module is detachable from the first joint of the supporting frame.

2. The quick release pivot module as claimed in claim 1, wherein (i) the quick release structure has a slide button and a connecting board, (ii) the slide button extends along a first axis, whereas the connecting board extends from the slide button along a second axis, (iii) the second engaging portion is a latch extending along a third axis to couple with the connecting board, while the first engaging portion has a hole, (iv) the second joint has a slide groove corresponding to the hole, and the latch extends through the slide groove to be selectively located in the hole, and (v) the second joint is fastened to the first joint when the latch is retained in the hole, and is detachable from the first joint when the latch is moved off the hole along the first axis by movement of the slide button along the first axis.

3. The quick release pivot module as claimed in claim 2, wherein (i) the second joint has a first central board and two opposite first lateral plates, (ii) the first lateral plates extend from two ends of the first central board along the third axis, respectively, and (iii) the quick release structure has a tension spring that extends along the first axis and has two ends fastened to the latch and one of the first lateral plates, respectively.

4. The quick release pivot module as claimed in claim 3, further comprising a shell covering parts of the pivot structure and parts of the quick release structure, the shell having a stepped through hole, wherein the slide button is disposed in the stepped through hole and the connecting board extends through the stepped through hole.

5. The quick release pivot module as claimed in claim 4, wherein (i) the second joint has a stopper and a first protrusion extending from the first central board along the third axis, (ii) the stopper has a slot, and the first joint has a second protrusion and an aperture, and (iii) when the second joint is connected to the first joint, the stopper is disposed on a top surface of the first joint, with the second protrusion being engaged in the slot and the first protrusion being embedded in the aperture.

6. The quick release pivot module as claimed in claim 5, wherein the first engaging portion has two bumps, of which one is formed with the hole adjacent to the other one of the bumps, and the hole t extends along the first axis.

7. The quick release pivot module as claimed in claim 6, wherein (i) the first connector has a second central board and two opposite second lateral plates, (ii) the second lateral plates extend in parallel to each other from two ends of the second central board, (iii) the first lateral plates and the second lateral plates each have an axle hole, and (iv) the shaft extends through each of the axle holes sequentially.

8. The quick release pivot module as claimed in claim 6, wherein the second protrusion is secured in the slot, and the first protrusion is secured in the aperture.

9. The quick release pivot module as claimed in claim 7, wherein the pivot structure has at least one torsional spring being sleeved on the shaft, and two ends of the torsional spring are fastened to the second joint and the first connector, respectively, so that the torsional spring generates a torque when the first connector pivots with respect to the second joint.

10. The quick release pivot module as claimed in claim 2, wherein the first joint is a pulley provided for permitting the display to move upward and downward along the second axis.

11. A supporting device, being disposed on a working surface to support a display and comprising a supporting frame and the quick release pivot module as claimed in claim 1, wherein the quick release pivot module is disposed between the display and the supporting frame, and the supporting frame has a spring module for providing an elastic force against weight of the display, and the elastic force is adjustable according to the weight of the display.

12. The supporting device as claimed in claim 11, wherein (i) the quick release structure has a slide button and a connecting board, (ii) the slide button extends along a first axis, whereas the connecting board extends from the slide button along a second axis, (iii) the second engaging portion is a latch extending along a third axis to couple with the connecting board, while the first engaging portion has a hole, (iv) the second joint has a slide groove corresponding to the hole, and the latch extends through the slide groove to be selectively located in the hole, and (v) the second joint is fastened to the first joint when the latch is retained in the hole, and is detachable from the first joint when the latch is moved off the hole along the first axis by movement of the slide button along the first axis.

13. The supporting device as claimed in claim 12, wherein (i) the second joint has a first central board and two opposite first lateral plates, (ii) the first lateral plates extend from two ends of the first central board along the third axis, respectively, and (iii) the quick release structure has a tension spring that extends along the first axis and has two ends fastened to the latch and one of the first lateral plates, respectively.

14. The supporting device as claimed in claim 13, wherein the quick release pivot module further comprises a shell that has a stepped through hole and covers parts of the pivot structure and parts of the quick release structure, and the slide button is disposed in the stepped through hole and the connecting board extends through the stepped through hole.

15. The supporting device as claimed in claim 14, wherein (i) the second joint has a stopper and a first protrusion extending from the first central board along the third axis, (ii) the stopper has a slot, and the first joint has a second protrusion and an aperture, and (iii) when the second joint is connected to the first joint, the stopper is disposed on a top surface of the first joint, with the second protrusion being engaged in the slot and the first protrusion being embedded in the aperture.

16. The supporting device as claimed in claim 15, wherein the first engaging portion has two bumps, of which one is formed with the hole adjacent to the other one of the bumps, and the hole t extends along the first axis.

* * * * *